United States Patent
McGrath et al.

(10) Patent No.: US 6,438,664 B1
(45) Date of Patent: Aug. 20, 2002

(54) MICROCODE PATCH DEVICE AND METHOD FOR PATCHING MICROCODE USING MATCH REGISTERS AND PATCH ROUTINES

(75) Inventors: Kevin J. McGrath, Los Gatos, CA (US); James K. Pickett, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/428,635

(22) Filed: Oct. 27, 1999

(51) Int. Cl.⁷ .......................... G06F 9/00; G06F 12/00; G06F 13/00
(52) U.S. Cl. ................. 711/154; 711/102; 711/165; 711/202; 712/245
(58) Field of Search ................... 711/102, 103, 711/202, 213, 154, 165; 712/244, 245; 714/8

(56) References Cited

U.S. PATENT DOCUMENTS

| | | |
|---|---|---|
| 4,028,678 A | 6/1977 | Moran |
| 4,028,679 A | 6/1977 | Divine |

(List continued on next page.)

FOREIGN PATENT DOCUMENTS

| | | |
|---|---|---|
| EP | 259095 | 3/1988 |
| EP | 381471 | 8/1990 |
| EP | 03079031 | 4/1991 |
| EP | 640 916 | 3/1995 |
| EP | 0651320 | 5/1995 |
| GB | 2227584 | 8/1990 |
| GB | 459232 | 12/1991 |
| GB | 2263985 | 8/1993 |
| GB | 2263987 | 8/1993 |
| GB | 2281422 | 3/1995 |

OTHER PUBLICATIONS

XP 000552115, "Breakpoints in Masked Microcontrollers To Fix Latent Software Defects", Michael Wilinson, Motorola Technical Developments, Nov. 1995, 1 page.

Mike Johnson, "Superscalar Microprocessor Design", AMD, Jan. 24, 1994, pp. 71–75.

Intel, "Pentuim Processor User's Manual", vol. 3, Architecture and Programming Manual, 1993, 7 pages.

Intel, "Pentium Processor Family User's Manual", vol. 1, Pentium Processor Family Data Book, 1994, 6 pages.

Michael Slater, "AMD's K5 Designed to Outrun Pentium", Microprocessor Report, Oct. 24, 1994, MicroDesign Resources, 7 pages.

Sebastian Rupley and John Clyman, "P6: The Next Step!", Pc Magazine, Sep. 12, 1995, 16 pages.

(List continued on next page.)

*Primary Examiner*—Glenn Gossage
(74) *Attorney, Agent, or Firm*—Conley, Rose & Tayon, PC; Robert C. Kowert

(57) ABSTRACT

Random access memory (RAM) may be provided in a processor for implementing microcode patches. The patch RAM may loaded by a microcode routine that is part of the normal microcode contained in a microcode read only memory (ROM) unit of the processor. When the processor powers-up, it uses its internal ROM microcode only if no patches are installed. If patches are installed and a microcode line is accessed for which a patch is enabled, the patch is executed instead of the microcode line. A patch may be enabled by setting a match register with the address of the microcode instruction line in the microcode ROM that is to be patched. Whenever the microcode ROM address matches the contents of a match register, control is transferred to the patch RAM. The patch RAM may have a plurality of fixed entry points each corresponding to a different match register.

38 Claims, 6 Drawing Sheets

U.S. PATENT DOCUMENTS

| | | |
|---|---|---|
| 4,028,683 A | 6/1977 | Divine et al. |
| 4,028,684 A | 6/1977 | Divine et al. |
| 4,044,338 A | 8/1977 | Wolf |
| 4,319,079 A | 3/1982 | Best |
| 4,400,798 A | 8/1983 | Francis et al. |
| 4,453,212 A | 6/1984 | Gaither et al. |
| 4,482,953 A | 11/1984 | Burke |
| 4,542,453 A | 9/1985 | Patrick et al |
| 4,577,319 A | 3/1986 | Takeuchi et al. |
| 4,610,000 A | 9/1986 | Lee |
| 4,751,703 A | 6/1988 | Picon et al. |
| 4,802,119 A | 1/1989 | Heene et al. |
| 4,807,115 A | 2/1989 | Torng |
| 4,807,857 A | 2/1989 | Wolf et al. |
| 4,839,797 A | 6/1989 | Katori et al. |
| 4,857,612 A | 8/1989 | Bacskai |
| 4,858,105 A | 8/1989 | Kuriyama et al. |
| 4,928,223 A | 5/1990 | Dao et al. |
| 4,982,360 A | 1/1991 | Johnson et al. |
| 5,053,631 A | 10/1991 | Perlman et al. |
| 5,053,949 A | 10/1991 | Allison et al. |
| 5,058,048 A | 10/1991 | Gupta et al. |
| 5,115,500 A | 5/1992 | Larsen |
| 5,129,067 A | 7/1992 | Johnson |
| 5,136,697 A | 8/1992 | Johnson |
| 5,167,026 A | 11/1992 | Murray et al. |
| 5,202,967 A | 4/1993 | Matsuzaki et al. |
| 5,212,693 A | 5/1993 | Chao et al. |
| 5,226,126 A | 7/1993 | McGarland et al. |
| 5,226,130 A | 7/1993 | Favor et al. |
| 5,233,696 A | 8/1993 | Suzuki |
| 5,235,686 A | 8/1993 | Bosshart |
| 5,295,247 A | 3/1994 | Chang et al. |
| 5,299,318 A | 3/1994 | Bernard et al. |
| 5,321,830 A | 6/1994 | Nakamura et al. |
| 5,333,292 A | 7/1994 | Takemoto et al. |
| 5,337,415 A | 8/1994 | DeLano et al. |
| 5,355,463 A | 10/1994 | Moeller |
| 5,357,627 A | 10/1994 | Miyazawa et al. |
| 5,367,571 A | 11/1994 | Bowen et al. |
| 5,371,864 A | 12/1994 | Chuang |
| 5,379,301 A | 1/1995 | Sato et al. |
| 5,394,558 A | 2/1995 | Arakawa et al. |
| 5,394,559 A | 2/1995 | Hemmie et al. |
| 5,425,036 A | 6/1995 | Liu et al. |
| 5,430,851 A | 7/1995 | Hirata et al. |
| 5,440,632 A | 8/1995 | Bacon et al. |
| 5,442,760 A | 8/1995 | Rustad et al. |
| 5,454,100 A | 9/1995 | Sagane |
| 5,459,844 A | 10/1995 | Eickemeyer et al. |
| 5,481,713 A | 1/1996 | Wetmore et al. |
| 5,488,710 A | 1/1996 | Sato et al. |
| 5,488,729 A | 1/1996 | Vegesna et al. |
| 5,500,942 A | 3/1996 | Eickemeyer et al. |
| 5,504,923 A | 4/1996 | Ando |
| 5,509,130 A | 4/1996 | Trauben et al. |
| 5,535,329 A | 7/1996 | Hastings |
| 5,537,629 A | 7/1996 | Brown et al. |
| 5,553,301 A | 9/1996 | New et al. |
| 5,559,975 A | 9/1996 | Christie et al |
| 5,560,028 A | 9/1996 | Sachs et al. |
| 5,566,298 A | 10/1996 | Boggs et al. |
| 5,600,806 A | 2/1997 | Brown et al. |
| 5,619,666 A | 4/1997 | Coon et al. |
| 5,623,619 A | 4/1997 | Witt |
| 5,625,787 A | 4/1997 | Mahin et al. |
| 5,630,083 A | 5/1997 | Carbine et al. |
| 5,636,374 A | 6/1997 | Rodgers et al. |
| 5,655,097 A | 8/1997 | Witt et al. |
| 5,664,134 A | 9/1997 | Gallup et al. |
| 5,689,672 A | 11/1997 | Witt et al. |
| 5,694,348 A | 12/1997 | Guttag et al. |
| 5,694,587 A | 12/1997 | Webb et al. |
| 5,696,955 A | 12/1997 | Goddard et al. |
| 5,713,035 A | 1/1998 | Farrell, et al |
| 5,740,413 A | 4/1998 | Alpert et al. |
| 5,742,794 A | 4/1998 | Potter |
| 5,752,259 A | 5/1998 | Tran |
| 5,764,884 A | 6/1998 | Van Fleet |
| 5,790,843 A | 8/1998 | Borkenhagen et al. |
| 5,790,860 A | 8/1998 | Wetmore et al. |
| 5,794,063 A | 8/1998 | Favor |
| 5,796,972 A | 8/1998 | Johnson et al. |
| 5,796,973 A | 8/1998 | Witt et al. |
| 5,796,974 A * | 8/1998 | Goddard et al. ............ 712/211 |
| 5,799,144 A | 8/1998 | Mio |
| 5,829,012 A * | 10/1998 | Marlan et al. .............. 711/102 |
| 5,845,102 A | 12/1998 | Miller et al. |
| 5,872,946 A * | 2/1999 | Narayan et al. ............ 712/204 |
| 5,884,058 A | 3/1999 | Narayan et al. |
| 5,901,225 A * | 5/1999 | Ireton et al. .................. 714/7 |
| 5,920,710 A | 7/1999 | Tran et al |
| 5,933,629 A | 8/1999 | Mahalingaiah, et al |
| 5,983,337 A * | 11/1999 | Mahalingaiah et al. ....... 712/32 |
| 6,009,513 A | 12/1999 | Mahalingaiah, et al. |
| 6,141,740 A * | 10/2000 | Mahalingaiah et al. ..... 711/215 |
| 6,158,018 A * | 12/2000 | Bernasconi et al. ........... 714/8 |
| 6,161,172 A | 12/2000 | Narayan et al. |
| 6,192,468 B1 | 2/2001 | Mahalingaiah, et al. |

OTHER PUBLICATIONS

Tom R. Halfhill, "AMD K6 Takes On Intell P6", BYTE, Jan. 1996, 4 pages.

IBM Technical Disclosure Bulletin Entitled, "On–Site ROS Patch Mechanism", vol. 30, No. 5, Oct. 1987, New York, USA, pp. 158–160.

Scherpenberg, F.A., et al., Electronics De 1984 A 1985: Electronics Wee, "Asynchronous Circuits Accelerate Access to 256–K Read–Only Memory", pp. 141–145.

* cited by examiner

MICROCODE PATCH DEVICE AND METHOD FOR PATCHING MICROCODE USING MATCH REGISTERS AND PATCH ROUTINES

BACKGROUND OF THE INVENTION

1. Field of the Invention

This invention is related to the field of processors and, more particularly, to microcode patching within processors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

Microprocessor designers often design their products in accordance with the x86 microprocessor architecture in order to take advantage of its widespread acceptance in the computer industry. Because the x86 microprocessor architecture is pervasive, many computer programs are written in accordance with the architecture. X86 compatible microprocessors may execute these computer programs, thereby becoming more attractive to computer system designers who desire x86-capable computer systems. Such computer systems are often well received within the industry due to the wide range of available computer programs.

The x86 microprocessor architecture specifies a variable length instruction set (i.e. an instruction set in which various instructions employ differing numbers of bytes to specify that instruction). For example, the 80386 and later versions of x86 microprocessors employ between 1 and 15 bytes to specify a particular instruction. Instructions have an opcode, which may be 1–2 bytes, and additional bytes may be added to specify addressing modes, operands, and additional details regarding the instruction to be executed. Certain instructions within the x86 instruction set are quite complex, specifying multiple operations to be performed. For example, the PUSHA instruction specifies that each of the x86 registers be pushed onto a stack defined by the value in the ESP register. The corresponding operations are a store operation for each register, and decrements of the ESP register between each store operation to generate the address for the next store operation.

Often, complex instructions are classified as microcode read only memory (MROM) instructions. MROM instructions are transmitted to a microcode instruction unit within the microprocessor, which decodes the complex MROM instruction and produces two or more simpler microcode instructions for execution by the microprocessor. The simpler microcode instructions corresponding to the MROM instruction are typically stored in a read-only memory (ROM) within the microcode unit. The microcode instruction unit determines an address within the ROM at which the microcode instructions are stored, and transfers the microcode instructions out of the ROM beginning at that address. Multiple clock cycles may be used to transfer the entire set of instructions within the ROM that correspond to the MROM instruction.

Different instructions may require differing numbers of microcode instructions to effectuate their corresponding functions. Additionally, the number of microcode instructions corresponding to a particular MROM instruction may vary according to the addressing mode of the instruction, the operand values, and/or the options included with the instruction. The microcode instruction unit issues the microcode instructions into the instruction processing pipeline of the microprocessor. The microcode instructions are thereafter executed in a similar fashion to other instructions. It is noted that the microcode instructions may be instructions defined within the instruction set, or may be custom instructions defined for the particular microprocessor.

Conversely, less complex instructions are decoded by hardware decode units within the microprocessor, without intervention by the microcode unit. The terms "directly-decoded instruction" and "fastpath instruction" will be used herein to refer to instructions which are decoded and executed by the microprocessor without the aid of a microcode instruction unit. As opposed to MROM instructions which are reduced to simpler instructions which may be handled by the microprocessor, directly-decoded instructions are decoded and executed via hardware decode and functional units included within the microprocessor.

New microprocessor designs typically are produced in iterative steps. Microprocessor prototypes are fabricated on silicon chips, and then are tested using various techniques to determine if the processor design, as fabricated, will perform satisfactorily. As errors are detected, the microprocessor design is modified and new prototypes are produced embodying the modified design. This seemingly continuous process of designing, fabricating and testing a processor design is referred to as "debugging."

One of the portions of the microprocessor design that requires debugging is the microcode. As the microprocessor is tested, errors may be discovered in the microcode instructions. Because of the limited access to the microcode, the microcode is typically changed only when new prototypes are produced for successive designs. Furthermore, when errors are found in the microcode, all related debugging is typically stopped, because it is inefficient to modify the processor hardware when the associated microcode will be revised. Consequently, further debugging in related areas may be halted until the new prototypes are produced.

When errors (or bugs) are found in microcode instructions, these errors are documented to system designers. Typically, the system designers run simulations to find ways to change the microcode to correct the errors detected. These changes cannot be effectively tested until the next prototype is produced with the changes to the microcode embedded in the internal ROM of the subsequent processor prototype. A problem with this approach is that the changes to the microcode cannot be easily or completely verified in the system environment before the changes are committed to silicon. This procedure can greatly increase the cost and time expended during the design process, as unverified changes are made to the microcode and incorporated in a subsequent prototype of the microprocessor, only to fail.

It may also be desirable to enter production with a processor even though the processor microcode still has some "bugs". In this situation, it may be desirable to somehow distribute microcode "fixes" users along with the processor. Also, it may be desirable to be able to somehow "patch" processor microcode if microcode bugs or other bugs are discovered after a processor has already shipped to customers. Thus, it may be desirable to distribute or update microcode patches after a processor is in production.

One conventional way to address the above concerns is to incorporate a technique for patching existing instructions with substitute microcode instructions. When an instruction that needs to be patched is encountered, the instruction fetching mechanism of the microprocessor accesses the substitute microcode instruction from external memory and loads the substitute microcode instruction into the instruction cache. As used herein, the term "external memory" refers to any storage device external to the microprocessor. The substitute microcode instruction, or patched microcode instruction, is then dispatched into the instruction processing pipeline as a substitute for the existing instruction.

Unfortunately, fetching patched microcode instructions from external memory causes a significant portion of the microprocessor to be redesigned. The instruction fetching and alignment mechanisms are designed for x86 type instructions, not microcode instructions. Microcode instructions are typically a different length then x86 instructions and are encoded differently. Therefore, the instruction fetching mechanism, instruction cache and other circuitry are not designed to handle microcode instructions. To implement the above described patching mechanism, this circuitry must be redesigned to accommodate patched microcode instructions.

Another problem with fetching microcode patches from external memory, or even from internal caches, is performance. In many conventional processors, the width of data returned by memory or cache accesses is smaller than the width of microcode instructions fetched from the microcode ROM of the processor. Thus, if a microcode patch is fetched from external memory or from a cache, multiple memory accesses will be required to load a patched microcode instruction, as compared to a single wide fetch from the processor's microcode ROM. Furthermore, the latency for memory accesses is typically much longer than for fetches from the internal microcode ROM. Thus, microcode patches fetched from external memory or cache typically have an adverse effect on processor performance since fetching such a patch typically requires more and slower accesses.

One prior art processor loads microcode patches from system memory into the processor before the patches are needed. Loading the patch data is triggered by a write to model specific register (MSR) 079h with some other register pointing to the patch data in memory. If the patch is successfully loaded, MSR 08Bh is loaded with a patch identification (ID). This technique may avoid having to fetch a patch from external memory when the patch is needed.

Another problem with conventional microcode patch mechanisms concerns triggering the patch. One technique has been to provide a tag memory in the processor having one bit for every location in the microcode ROM. If a particular microcode ROM location is to be patched, then the corresponding bit is set in the tag memory. However, for typical microcode ROM sizes, this technique may require thousands of bits of tag memory. Additionally, timing may be complicated to access all the bits of the tag memory for each microcode ROM fetch in order to check if a patch is enabled.

Another technique is to flag instruction set opcodes that are to be patched. For efficient space and timing reasons, this technique has been implemented so that flagged opcode bins cover multiple opcodes, resulting in "patching" opcodes that did not need to be patched. Additionally, if the microcode that needs to be patched does not correspond to an instruction set opcode, such as an exception handler, it can not be patched. Thus, this technique lacks granularity and is limited to only patching microcode corresponding to instruction set opcodes.

SUMMARY OF THE INVENTION

An amount of random access memory (RAM) may be provided in a processor for implementing microcode patches. The patch RAM may loaded by a microcode routine that is part of the normal microcode contained in a microcode ROM unit of the processor. When the processor powers-up it uses its internal ROM microcode only if no patches are installed. However, if patches are installed and if a microcode line is accessed for which a patch is enabled, the patch is executed instead of the microcode line.

A patch may be enabled by setting a match register with the address of the microcode instruction line in the microcode ROM that is to be patched. A processor may include several such match registers. Whenever the microcode ROM address matches the contents of one of the match registers, control is transferred to the patch RAM. The patch RAM may have a plurality of fixed entry points each corresponding to one of the match registers. Thus, when an MROM address matches a match register, control is passed to the patch RAM at the fixed entry point corresponding to the matching match register. To disable a match register, its contents may be written with a value that will never match any ROM address, e.g. −1.

Whenever a match is detected between an MROM address and a match register, the microcode instruction line from the ROM is disabled and control is transferred to the appropriate entry point in the patch RAM. In some embodiments, a delay slot may also be issued from the ROM while control is being transferred to the fixed entry point in the patch ROM. Thus, there may be a two cycle bubble in the MROM unit pipeline whenever control is transferred from the microcode ROM to the patch RAM since both the matching address line and the delay slot line from the ROM are cancelled. In a preferred embodiment, the patch RAM is a contiguously addressed extension of the microcode ROM. Therefore, regular microcode jump or branch instructions may be used when exiting a patch routine to return to the ROM. Thus, when exiting a patch routine there is no need to cancel any instructions and patch routines may be exited and MROM operation resumed with no delay.

In a preferred embodiment, the microcode patch routines are initially loaded into system memory. A microcode patch RAM loader routine is called and executed to load patch RAM data from the system memory into the processor's patch RAM. This is typically done by a command from basic input/output system (BIOS) or the operating system software shortly after power-up or reset of the processor.

One embodiment of a microcode patching device may include a first memory configured to store a plurality of microcode instruction lines. The first memory is configured to provide microcode instruction lines as accessed by an address provided to the first memory. The first memory provides addressed microcode instruction lines to a decode unit. The device also may include one or more match registers each configured to store a value indicating one of the microcode instruction lines in the first memory. A second memory may also be included and configured to store one or more microcode patch routines. A control unit causes one of the patch routines from the second memory to be provided to the decode unit if the address provided to the first memory matches the value stored in one of the match registers. The microcode instruction line provided by the first memory may be cancelled and the indicated patch routine executed instead. Patch routines may be located at a fixed entry point where each fixed entry point corresponds to a different match register so that when an address matches the value stored in a match register, control is transferred to the fixed entry point in the second memory corresponding to the matching match register. The first memory may include a microcode patch loader routine for loading the microcode patch routines from a third memory into the second memory. The microcode patch loader routine may be configured to cause one of the microcode patch routines to be executed if a flag is set in the third memory when the patch loader routine loads the microcode patch routines from the third memory to the second memory.

A method for patching microcode in a processor may include generating an address to access a microcode memory and comparing that address to values stored in one or more match registers. If the address does not match the value in any of the match registers, the method includes executing a microcode instruction line from the microcode memory as indicated by the address. If the address does match the value in one of the match registers, the method includes executing a microcode patch routine stored in a patch memory. The patch routine may be executed instead of the microcode instruction line from the microcode memory that was indicated by the address. In one embodiment, both the microcode instruction line as indicated by the address and a next line are dispatched from the microcode memory even if the address matches the value in one of the match registers. If a match occurs, the method includes canceling both the microcode instruction line and the next line dispatched from the microcode memory.

The method may further include loading one or more microcode patch routines from a system memory into the patch memory. This loading may include calling a patch loader routine in the microcode memory. Upon completion of loading the one or more microcode patch routines, the patch loader routine checks if a flag was set in the system memory and branches to one of the microcode patch routines located at a fixed location in the patch memory if the flag is set. The loading may include reading a header store in the system memory where the header indicates values for the match registers. Other information, such as patch ID's, check sums, and the above-mentioned flag, may be indicated in the header. Match registers may be disabled by indicating in the header that a particular match register should be set with a value, such a −1, that will not match any address of the microcode memory.

In one embodiment, a processor includes a microcode memory configured to store a plurality of microcode instruction lines. An address is provided to the microcode memory and the microcode memory provides the microcode instruction line indicated by the address. A patch memory is included and configured to store one or more microcode patch routines. Each microcode patch routine is located in the patch memory at a fixed entry point. Each fixed entry point is matched to a different address of the microcode memory to be patched. A control unit may also be included and configured to determine if the address provided to the microcode memory is for a microcode line in the microcode memory that is to be patched. If the address is for a line that is to be patched, the control unit causes the one of the patch routines from the patched memory that is located at the fixed entry point corresponding to the address provided to the microcode memory to be executed instead of the microcode line in the microcode memory. The processor may also include one or more match registers, wherein each match register is configured to store a value indicating the address of one of the microcode instruction lines in the microcode memory. The control unit determines if the address is for a microcode line in the microcode memory that is to be patched by comparing the address provided to the microcode memory to the values stored in the match registers.

BRIEF DESCRIPTION OF THE DRAWINGS

Other objects and advantages of the invention will become apparent upon reading the following detailed description and upon reference to the accompanying drawings in which.

Figure 1:
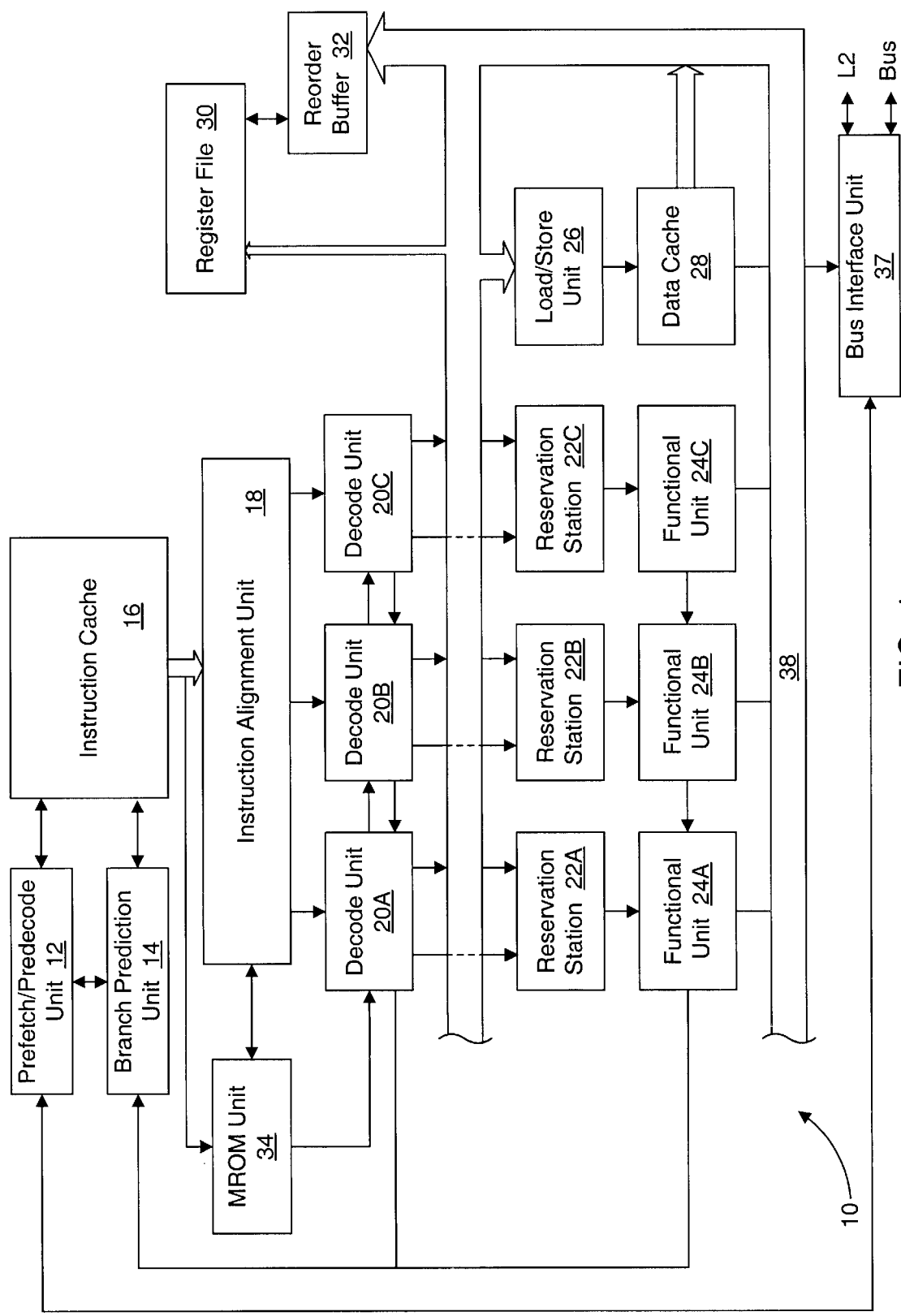
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram of one embodiment of a processor 10 is shown. Other embodiments are possible and contemplated. As shown in FIG. 1, processor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a bus interface unit 37. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from bus interface unit 37, and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to bus interface unit 37. Bus interface unit 37 is further coupled to an L2 interface to an L2 cache and a bus. Finally, MROM unit 34 is further coupled to decode units 20.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2 way set associative structure having 64 byte lines (a byte comprises 8 binary bits). Alternatively, any other desired configuration and size may be employed. For example, it is noted that instruction cache 16 may be implemented as a fully associative, set associative, or direct mapped configuration.

Instructions are stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14. Other embodiments may employ any suitable predecode scheme.

One encoding of the predecode tags for an embodiment of processor 10 employing a variable byte length instruction set will next be described. A variable byte length instruction set is an instruction set in which different instructions may occupy differing numbers of bytes. An exemplary variable byte length instruction set employed by one embodiment of processor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a MOD R/M byte, and an immediate byte would have start, end, and functional bits as follows:

| Start bits | 10000 |
|---|---|
| End bits | 00001 |
| Functional bits | 11000 |

MROM instructions are instructions which are determined to be too complex for decoding by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Processor 10 employs branch prediction in order to speculatively fetch instructions subsequent to conditional branch instructions. Branch prediction unit 14 is included to perform branch prediction operations. In one embodiment, branch prediction unit 14 employs a branch target buffer which caches up to two branch target addresses and corresponding taken/not taken predictions per 16 byte portion of a cache line in instruction cache 16. The branch target buffer may, for example, comprise 2048 entries or any other suitable number of entries. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of processor 10. In an alternative configuration, branch prediction unit 14 may be coupled to reorder buffer 32 instead of decode units 20 and functional units 24, and may receive branch misprediction information from reorder buffer 32. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Decode unit 20A receives an instruction which is prior to instructions concurrently received by decode units 20B and 20C (in program order).

Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction. In one particular embodiment, each instruction is decoded into up to two operations which may be separately executed by functional units 24A–24C.

Processor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decoding of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to six pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decoding of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of processor 10 which employ the x86 processor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decoding, is determined to modify the contents of one of the real registers. Therefore, at various points during execution of a particular program, reorder buffer 32 may have one or more locations which contain the speculatively executed contents of a given register. If following decoding of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of processor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case. In embodiments in which instructions may be decoded into multiple operations to be executed by functional units 24, the operations may be scheduled separately from each other.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 or reorder buffer 32 and subsequently communicating with reorder buffer 32 to complete the instructions. Additionally, functional units 24 may be configured to perform address generation for load and store memory operations performed by load/store unit 26. In one particular embodiment, each functional unit 24 may comprise an address generation unit for generating addresses and an execute unit for performing the remaining functions. The two units may operate independently upon different instructions or operations during a clock cycle.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32. It is further noted that branch execution results may be provided by functional units 24 to reorder buffer 32, which may indicate branch mispredictions to functional units 24.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a first load/store buffer having storage locations for data and address information for pending loads or stores which have not accessed data cache 28 and a second load/store buffer having storage locations for data and address information for loads and stores which have accessed data cache 28. For example, the first buffer may comprise 12 locations and the second buffer may comprise 32 locations. Decode units 20 arbitrate for access to the load/store unit 26. When the first buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between processor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 processor architecture.

Data cache 28 is a high speed cache memory provided to temporarily store data being transferred between load/store unit 26 and the main memory subsystem. In one embodiment, data cache 28 has a capacity of storing up to 64 kilobytes of data in a two way set associative structure. It is understood that data cache 28 may be implemented in a variety of specific memory configurations, including a set associative configuration, a fully associative configuration, a direct-mapped configuration, or other configuration, and may be any suitable size.

In one particular embodiment of processor 10 employing the x86 processor architecture, instruction cache 16 and data cache 28 are linearly addressed and physically tagged. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. The physical address is compared to the physical tags to determine a hit/miss status.

Bus interface unit 37 is configured to communicate between processor 10 and other components in a computer system via a bus. For example, the bus may be compatible with the EV-6 bus developed by Digital Equipment Corporation. Alternatively, any suitable interconnect structure may be used including packet-based, unidirectional or bi-directional links, etc. An optional L2 cache interface may be employed as well, for interfacing to a level two cache.

Figure 2:
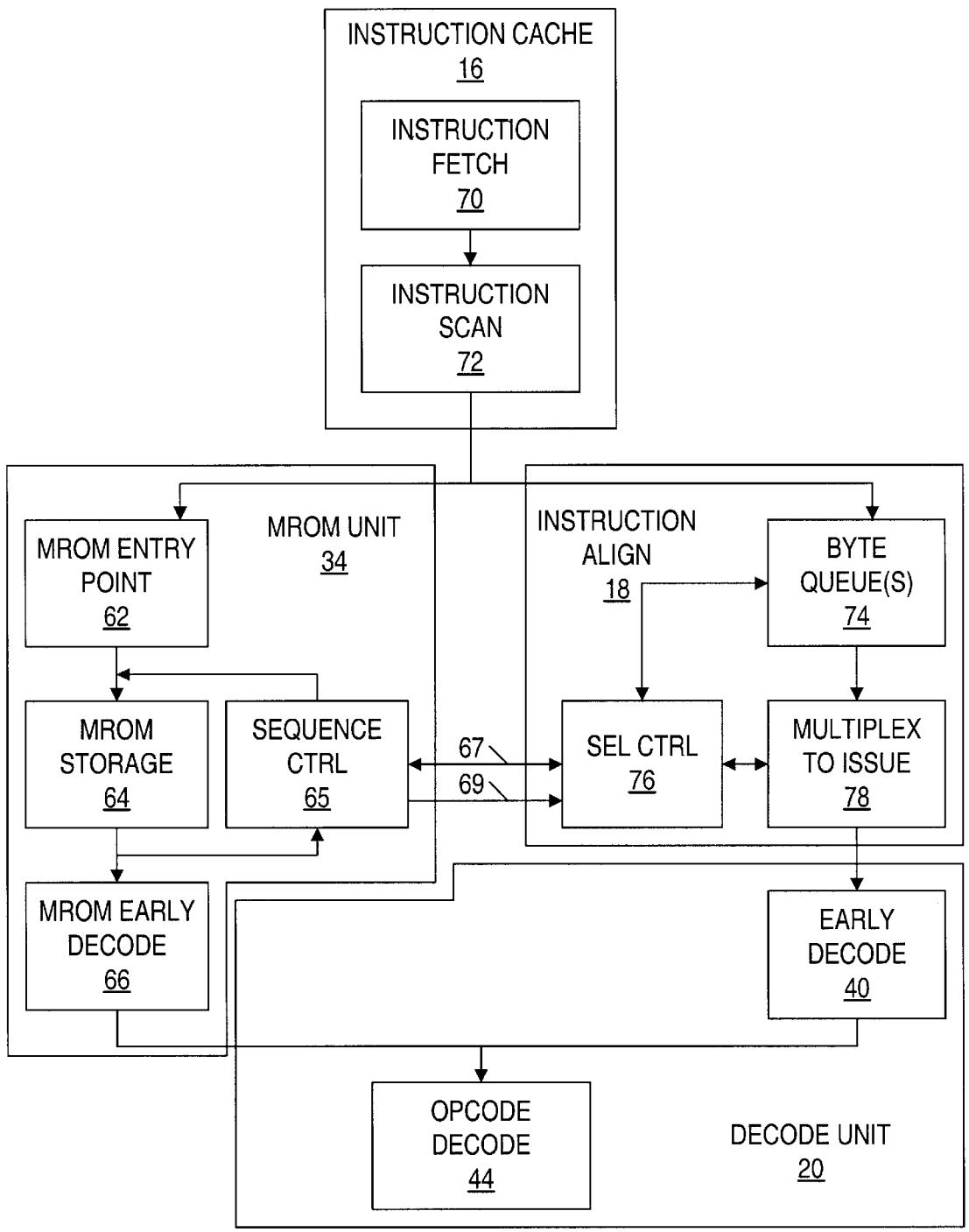
FIG. 2 is a diagram depicting a portion of an instruction processing pipeline employed by one embodiment of the microprocessor shown in FIG. 1.

Turning now to FIG. 2, a diagram depicting portions of instruction cache 16, instruction alignment unit 18, decode unit 20 and MROM unit 34 is shown. Embodiments of microprocessor 10 may employ other elements in addition to those shown in FIG. 2. Instruction cache 16 includes instruction fetch 70 and instruction scan 72. MROM unit 34 includes MROM entry point 62, MROM storage 64, sequence control 65, and MROM early decode 66. Instruction alignment unit 18 includes byte queue(s) 74, selection control unit 76, and multiplex to issue 78. Decode unit 20 includes early decode 40 and opcode decode 44.

Instruction fetch 70 fetches instructions from instruction cache storage (not shown) using addresses provided by branch prediction unit 14. Instruction fetch 70 conveys the fetched instructions to instruction scan unit 72. Generally speaking, an instruction fetch unit is a device that fetches instruction to be executed by a microprocessor. Instruction scan unit 72 conveys the instructions to byte queue(s) 74, and detects MROM instructions. Byte queue(s) 74 may include two instruction queues. The first queue receives instructions from the instruction cache and selects instructions to pass on to the second queue based on information received from the instruction cache. Further selection criteria are applied to the second queue to select instructions to be dispatched to the decode unit. For more information on such an embodiment, see U.S. Pat. No. 5,872,946 which is hereby incorporated by reference in its entirety. MROM instructions detected by instruction scan unit 72 are conveyed to MROM entry point 62. In one embodiment, one MROM instruction per clock cycle is accepted by MROM unit 34. Therefore, if a second MROM instruction is detected within a set of instruction bytes being scanned during a particular clock cycle, instruction blocks including the second MROM instruction and subsequent instructions in the program order are stalled until a subsequent clock cycle.

The flow of instructions through MROM unit 34 is discussed next. MROM entry point 62 calculates the location, or microaddress, of the first microcode instruction in MROM storage 64 that corresponds to an MROM instruction received from instruction scan unit 72. In one embodiment, the microaddress is calculated from the opcode, the MOD R/M bytes, and the prefix byte of the MROM instruction. The microaddress calculated by MROM entry point 62 is the location of the first microcode line that stores the microcode instructions that effectuate the desired operation of the MROM instruction. Microcode instructions, like fastpath instructions, are directly decodeable by the decode unit. The number of microcode instructions required to implement an MROM instruction varies from MROM instruction to MROM instruction. Complex MROM instructions may require many microcode instructions, and relatively simple MROM instructions may be implemented by two microcode instructions. The microcode instructions that implement an MROM instruction may include branch instructions. For example, in one embodiment the microcode instructions to implement the MROM instruction MOVS are:

|  | LDDF |  | ;load direction flag to latch in FU |
|---|---|---|---|
|  | OR | ecx,ecx | ;test if ecx is zero |
|  | JZ | end_loop | ;terminate string moves if ecx is zero |
| loop: | MOVFM+ | tmp0, [esi] | ;move to tmp0 data from source and inc/dec esi |
|  | MOVTM+ | [edi], tmp0 | ;move the data to destination and inc/dec edi |
|  | DECXJNZ | loop | ;dec ecx and repeat until zero |
| end_loop: | EXIT |  |  |

MROM storage 64 is a storage device capable of storing microcode instructions. In one embodiment, MROM storage 64 is a read-only memory (ROM). In other embodiments, other storage devices can be used to implement MROM storage 64. MROM storage 64 uses the entry point microaddress generated by MROM entry point 62 to access the first microcode instruction line. In one embodiment, MROM storage 64 stores multiple microcode instructions in each microcode line of MROM storage 64. In one specific embodiment, each microcode line contains a number of microcode instructions equal to the number of functional units in the microprocessor. In such an embodiment in which three functional units are employed, each microcode line may include three instructions referred to as a triad. Because the number of microcode instructions required to implement an MROM instruction may exceed the number of microcode instructions in one line of MROM storage 64, sequence control 65 determines the location of the next line of microcode to be accessed. The next line of microcode to execute may be the subsequent line in MROM storage 64 in incremental order. If, however, a microcode line in MROM storage 64 includes a "taken" branch instruction, sequence control unit 65 detects the branch microaddress and provides that microaddress as the next line to access from MROM storage 64. Branches may be delayed by one cycle so that the next incremental line in MROM storage 64 is fetched before a taken branch takes effect. MROM storage 64 may contain two types of branch instructions: conditional sequence control branches and predict branches. A conditional sequence control branch is a branch instruction in which the branch condition can be resolved during decode. Predict branches are branches that cannot be resolved until the branch instruction is executed by a functional unit. Predict branches may depend on the state of the EFLAGs register. Because dispatched instructions that have not completed execution may modify the contents of this register, the branch condition cannot be resolved during decoding. Therefore, a prediction is made whether the branch is "taken" or "not taken". If the branch is predicted "taken", sequence control 65 generates the microaddress of the next microcode line to access. If the branch is predicted "not taken", sequence control 65 provides the microaddress of the next microcode line as the next microcode line to access. This branch determination may be delayed by one cycle. In such an embodiment, the next incremental microcode line is fetched, and then the effect of the branch is applied. In one embodiment, MROM unit 34 uses static branch prediction. In other words, the prediction is made during coding of the microcode and does not change. Other embodiments may use more complex branch prediction algorithms.

In addition to specifying branch addresses, sequence control 65 also detects the last line of the microcode sequence. If a line of microcode in MROM storage 64 is the last line of microcode to implement an MROM instruction, sequence control 65 selects the entry point of the next MROM instruction, provided by MROM entry point 62, as the microaddress of the next line of microcode. Detection of the last line may be treated similar to a branch and may be delayed by one cycle as mentioned above. In such an embodiment, it may be desirable for the microcode to indicate the end of a routine at the next to last line of the routine. Alternatively, NOPs could be stored at the delay slot line.

Each line of microcode accessed from MROM storage 64 is dispatched to MROM early decode 66. MROM early decode 66 formats the instructions similar to the formatting of early decode unit 40, which will be discussed in more detail below with reference to FIG. 5. The formatted instructions are conveyed to opcode decode 44, which selects either the microcode instructions conveyed by MROM early decode 66 or fastpath instructions conveyed by early decode 40.

Fastpath instructions from instruction alignment unit 18 are stalled while MROM microcode instructions that implement an MROM instruction are issued by MROM unit 34. It is noted that a particular MROM instruction may arrive at MROM storage 64 prior to being selected for dispatch from byte queue(s) 74. The particular MROM instruction may be subsequent to a large number of fast path instructions within the byte queue(s) and instructions are selected for dispatch in program order. MROM instructions are routed to MROM unit 34 but are not removed from the instruction blocks conveyed to instruction alignment unit 18. For these reasons, synchronization is provided between MROM storage 64 and multiplex to issue 78. When MROM storage 64 receives an entry point address from MROM entry point 62, MROM storage 64 informs multiplex to issue 78 by asserting a signal upon synchronization bus 67. When multiplex to issue 78 receives a dispatched MROM instruction from byte queue(s) 74, multiplex to issue 78 signals MROM storage 64 via synchronization bus 67. In this manner, the MROM instruction progresses to both MROM early decode 66 and early decode 40 during the same clock cycle. Because both MROM storage 64 and multiplex to issue 78 receive instructions in program order it is sufficient to synchronize instructions via synchronization bus 67.

As discussed above, sequence control 65 determines the microaddress of the next microcode line to access from MROM storage 64. To generate the next address, each microcode line has a microcode sequence control field, or simply "sequence control field", associated with it. Generally speaking, a sequence control field is a field that contains data used to control the access of data within an MROM storage device. In one embodiment, this field contains data indicating whether the line indicates the end of the microcode instruction routine, whether the microcode line contains a jump, call or branch, conditions for conditional microbranches, and other information necessary for sequence control of MROM storage 64. To allow sufficient timing, determinations based on the sequence control field may be delayed by one cycle in sequence control 65. For example, if the sequence control field for microcode line A indicates to branch to line B, the sequence of lines fetched from MROM storage 64 is: A, A+1, B .... Microcode line A+1 is referred to as the "branch delay slot". Preferably, the microcode is arranged so that the branch delay slot includes microcode instructions that can be executed in spite of the branch (e.g. are not dependent upon the branch). Alternatively, the branch delay slot could include NOPs. In another embodiment, branches are not delayed. In this embodiment, the sequence control field for a microcode line is appended to the previous microcode line. In this manner, the sequence control field is known one cycle in advance. Therefore, the generation of the next address is done in parallel with accessing the microcode line from MROM storage 64.

Sequence control 65 also detects the end of a microcode sequence that implements an MROM instruction. In one embodiment, the sequence control field 65 appended to the microcode line prior to the last microcode line indicates that the subsequent microcode line is the last microcode line. This indication, called an early exit signal, is used by sequence control 65 to select the entry point generated by MROM entry point 62 as the microaddress from which to access a microcode line following the subsequent line. In addition to indicating that the subsequent microcode line is the last microcode line of an MROM instruction, the sequence control field may indicate how many microcode instructions are in the last microcode line. The number of microcode instructions in the last microcode line may be conveyed to selection control 76 via an early exit signal line 69. Selection control 76 can use the information from the early exit signal to pack additional fastpath instructions at the end of the microcode instruction line. In this manner, instructions are issued to each functional unit and dispatch bandwidth is not wasted.

Figure 3:
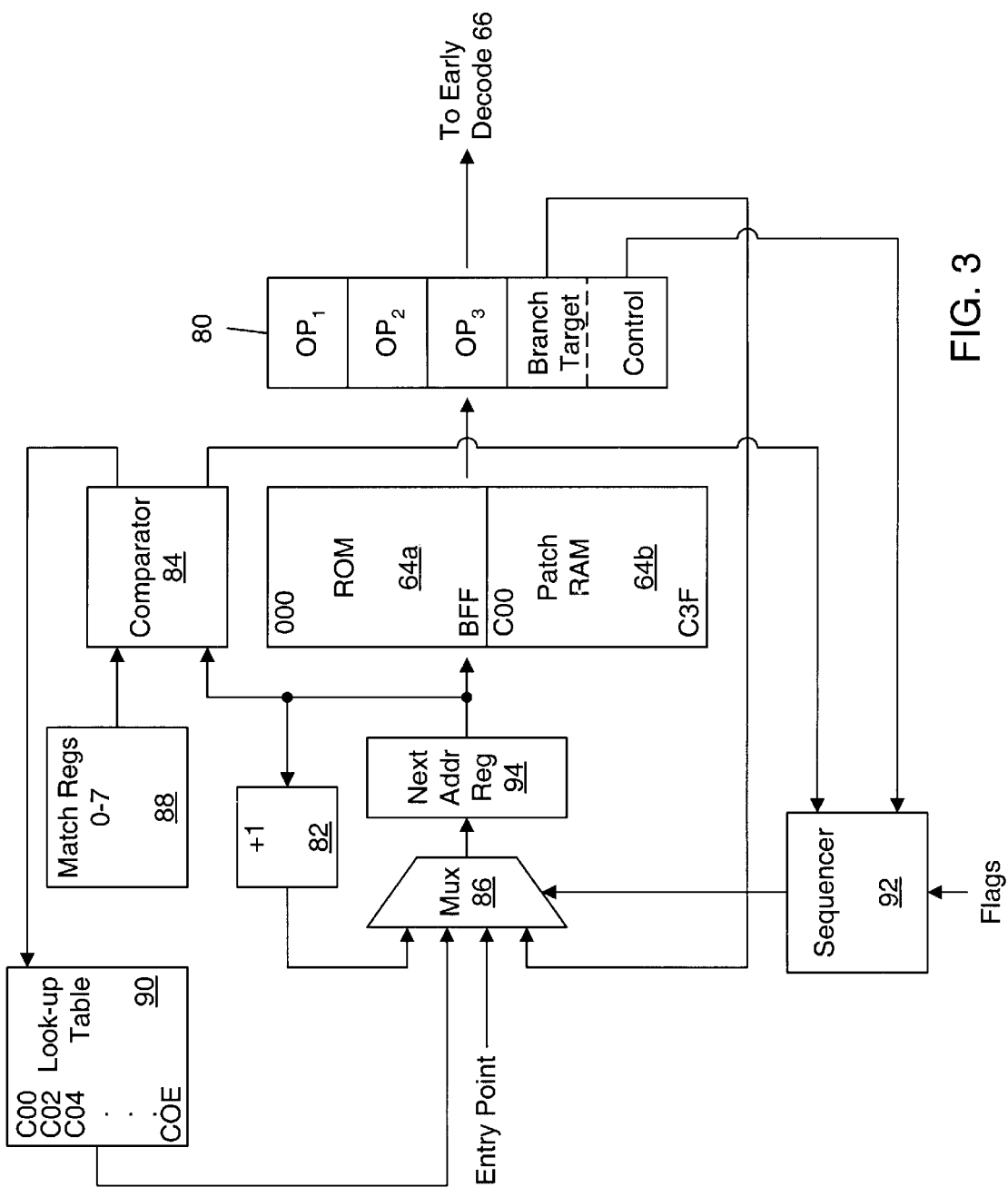
FIG. 3 is a block diagram of one embodiment of a portion of an MROM unit shown in FIG. 2.

Turning now to FIG. 3, a more detailed illustration is provided of a portion of MROM unit 34 that illustrates a mechanism for implementing patches to the microcode. MROM storage 64 may include a read only memory (ROM) portion 64a and a patch RAM portion 64b. The ROM portion 64a is where microcode instruction lines are typically accessed. In a preferred embodiment, ROM 64a holds up to 3K microcode lines or triads and patch RAM 64b stores up to 64 triads. In a preferred embodiment, patch RAM 64b exists in the same address space as ROM 64a and is addressed contiguously with ROM 64a. For example, in the embodiment in which the size of ROM 64a is 3072 (3K) lines and the size of patch RAM 64b is 64 lines, the microcode address range for ROM 64a would be 0x000 to 0xBFF and the address range for patch RAM 64b would be 0xC00 to 0xC3F. A line from ROM 64a or patch RAM 64b is selected according to an address from next address register 94. The selected line is provided to output register 80. In a preferred embodiment, each line or triad includes 3 microcode instructions OP1, OP2 and OP3, and a sequence control field. The sequence control field may include a branch target address and a control portion. The control portion may include information to determine whether or not the branch should be taken. The microcode instructions OP1 through OP3 are output to MROM early decode 66.

The next address to be selected in MROM storage 64 is determined by sequencer 92 which controls MUX 86. If sequencer 92 determines that the end of a microcode routine has been reached, for example, as indicated by the control portion of the sequence control field from output register 80, then sequencer 92 controls MUX 86 to select the entry point for the next microcoded instruction from MROM entry point 62. If a branch is indicated by the sequence control field, then sequencer 92 determines whether or not the branch should be taken. The branch may be conditioned upon various flag values such as from the EFLAGS register. Sequencer 92 receives flag values and the control portion of the sequence control field from output register 80 to determine whether or not a branch should be taken. If a branch is to be taken, sequencer 92 controls MUX 86 to select the branch target address as supplied by the branch target address portion of the sequence control field from output register 80. If a branch is not to be taken, sequencer 92 typically controls MUX 86 to select the next incremental address from incrementer 82. Note that in some embodiments, because of the pipeline structure of the MROM unit and the time required to determine branch conditions, branches may be delayed by one cycle such that the next incremental address is supplied to MROM storage 64 before the branch address is supplied. For example, if MROM storage line A indicates a branch to line B, the sequence of lines fetched from MROM storage 64 is: A, A+1, B .... Microcode storage line A+1 may be referred to as the branch delay slot.

The address from next address register 94 is also supplied to a comparator 84. Comparator 84 compares the address to values stored in a number of match registers 88. In one embodiment, match registers 88 include eight match registers where each match register stores 12 bits corresponding to a location in the 12 bit address space of MROM storage 64. Values are programmed into the match registers as described below. If the address from next address register 94 matches one of match registers 88, then a patch from patch RAM 64b will be implemented. When an address from next address register 94 matches the address stored in one of match registers 88, comparator 84 selects a corresponding patch RAM address from look up table 90. The selected address in look up table 90 is supplied to MUX 86. In a preferred embodiment, the addresses in look up table 90 are hard wired to correspond to particular ones of match registers 88. An example of look up table values for particular match registers for one embodiment is as follows:

| match reg | entry point |
|---|---|
| match0 | RAM offset 00 |
| match1 | RAM offset 02 |
| match2 | RAM offset 04 |
| match3 | RAM offset 06 |
| match4 | RAM offset 08 |
| match5 | RAM offset 0A |
| match6 | RAM offset 0C |
| match7 | RAM offset 0E |

Comparator 84 also indicates the occurrence of a match to sequencer 92. If a match has occurred, sequencer 92 controls MUX 86 to select the address from look up table 90.

Thus, when the next MROM storage address matches one of match registers 88, the MROM access sequence jumps to the address indicated by look up table 90. The microcode line that was fetched from ROM 64a into output register 80 is cancelled and a patch from patch RAM 64b is executed instead starting from the address indicated by look up table 90. Any delayed branch effects from jumping to the patch RAM are also cancelled. For example, in embodiments where branches are delayed by one cycle, both the line from ROM 64a that triggered the patch and the next line (the branch delay slot) are cancelled. Thus, in such an embodiment, whenever MROM unit 34 switches to a microcode patch in patch RAM 64b a two-cycle bubble in the MROM pipeline will be incurred.

A match register may be disabled by setting it to a value that will not match any address. In one embodiment, any one of match registers 88 which is not needed or which it is desired to disable, is set to −1 (0xFFF for a 12-bit embodiment). Also, in a preferred embodiment, a processor RESET initializes all match registers 88 to a −1 value so that all patches are disabled. However, an INIT does not change the match register values so that current enabled patches remain in effect.

In a preferred embodiment, the patch RAM locations indicated by look up table 90 form a vector table that points to a location in the rest of patch RAM 64b where the rest of the patch routine is located. In the example described above for look up table 90, the vector table entry points are located at every other address (e.g. offsets 00, 02, 04. . .) to allow for branch delay slots at the intervening addresses (e.g. offsets 01, 03, 05. . .)

Once control is transferred to patch RAM 64b execution continues from patch RAM 64b until a patch line jumps back into the ROM. In a preferred embodiment, in which the patch RAM exists as part of the MROM address space, a jump from the patch RAM 64b to ROM 64a may be treated as any other microcode jump or branch. Thus, while there may be a two cycle bubble when entering the patch RAM 64b as described above, there is no delay when jumping back to ROM 64a from patch RAM 64b. There is no delay when jumping back to ROM 64a because there is no need to cancel a patched microcode line or branch delay slot. The patch routine simply includes a normal microcode jump with a ROM target address.

Thus, using the mechanism described above in FIG. 3, any microcode line of ROM 64a may be patched by a routine loaded in patch RAM 64b. To invoke a patch, one of match registers 88 is programmed with the address corresponding to the line of MROM 64a desired to be patched. Note that the sizes and address ranges of ROM 64a and patch RAM 64b described above were merely examples for certain embodiments, other sizes may be employed as desired. Similarly, the number of match registers may be varied. Additionally, instead of being hard wired, in some embodiments look up table 90 may be programmable. Also note that sequencer 92, MUX 86, incrementer 82, look up table 90, match registers 88 and comparator 84 may all be considered to be part of sequence controller 65 from FIG. 2.

The contents of patch RAM 64b may be loaded from an external memory such as the system memory of a computer system in which processor 10 resides. Patch RAM 64b is loaded from memory by invoking a patch RAM loader routine. The patch RAM loader may be a microcode routine stored in MROM storage 64. In one embodiment, the patch RAM loader is invoked by a write to a particular model specific register (MSR) with another register pointing to a microcode patch block in memory. The patch RAM loader routine downloads microcode patch data from the microcode patch block in memory into the patch RAM 64b.

In a preferred embodiment, the microcode patch block in memory has a specific format including a header portion and a patch data portion. The header portion may be of a fixed size and may include necessary information to implement microcode patches. The data portion may be of a variable size but typically would not be longer than the size of patch RAM 64b. To simplify memory allocation, etc., the microcode patch block may be defined as having a maximum size, such as 2048 bytes in length, depending upon the length of patch RAM 64b and the required header size.

The microcode patch block header specifies the number of microcode lines or triads in the data block, a patch revision ID, a check sum, and match register values, among other things. The following is an example of a format for the microcode patch block header:

```
date code in hex
patch_ID
MPB_ID
patch_length (in triads)
init_flag
checksum
-(reserved)
match register 0
match register 1
match register 2
match register 3
match register 4
match register 5
match register 6
match register 7
```

In the example above, the header includes a date code. A patch ID is also included in the header. If the microcode patch block is successfully loaded, a register within processor 10 is loaded with the patch ID. The patch ID may be used for revision tracking. It is loaded into a register within the processor so that it may be read back to verify that the patch was successfully loaded. It also may be desirable to be able to read the patch ID to determine the revision of the patch currently installed in the processor. In a specific embodiment, the patch ID is loaded in model specific register 8Bh.

The header may also include a microcode patch block (MPB) ID. The microcode patch block ID is used to verify that the microcode patch block is compatible with the version of the patch RAM loader. When the patch RAM loader begins to load the microcode patch block, the microcode patch block ID is compared to a patch RAM loader ID.

If these ID's do not match, a general protection (GP(0)) fault may be generated and the patch block will not be loaded. The patch RAM loader may be written to expect a certain format for the microcode patch block. The microcode patch block ID allows the patch RAM loader to verify that the microcode patch block is of the correct format.

The header may also include a patch length field. The patch length indicates the length of the patch data block in triads.

The header may also include a flag to indicate that a particular patch should be executed immediately after the patch RAM is loaded. In the example above, an init flag is included for this purpose. When this flag is set it causes a jump to a particular patch RAM location immediately after patch RAM 64b is loaded. This feature allows the patch RAM to contain a microcode routine that is run immediately after the patch is loaded and before normal processor operation resumes. Such a patch routine that is executed immediately after loading the patch RAM may be useful for fixing or changing internal processor values that are not associated with microcode ROM routines and therefore cannot be patched by setting one of match registers 88 to correspond to a line in ROM 64a. For example, it may be necessary to change an internal processor configuration register to disable a hardware optimization that has been determined to be faulty. A microcode patch may be loaded into patch RAM 64b to appropriately change the internal configuration register. That patch may be placed at the init entry point which is jumped to after the patch RAM is loaded when the init flag is set. Typically this type of patch only needs to be run once, such as during a power-up software routine. When such a patch is loaded and the init flag is set, the microcode patch RAM loader will notice that the init flag is set and jump to the init entry point and the patch will be executed. Note that this mechanism provides a second way to enter patch RAM 64b in addition to using match registers 88. In a preferred embodiment, the init entry point in patch RAM 64b is a fixed location. This mechanism may be used to fix other processor bugs in addition to bugs in the microcode itself.

The microcode patch block header may also include a checksum to verify correct reception of data. Some fields of the header may also be reserved.

The header also includes values for the match registers 88. The match register values may indicate an address value for each match register which is to trigger a patch. The address value to be loaded in a particular match register corresponds to the address of a line or triad in ROM 64a. As described, if ROM 64a is accessed at an address matching an address loaded in one of the match registers, then a patch is executed from patch RAM 64b instead of the accessed ROM line and/or delayed branch slot from the ROM. In a preferred embodiment, each match register indicates a fixed entry point into patch RAM 64b as described above. A match register and its corresponding patch may be disabled by setting the value in the microcode patch block header for that match register with a value that will not match any MROM address. In a preferred embodiment, a match register is disabled by setting it to −1 (e.g. 0xFFF).

Following the microcode patch block header in memory is a microcode patch block data block. The patch data block may follow the header starting at a certain byte offset from the start of the microcode patch block. The data block has a number of microcode lines or triads that will be loaded into the microcode patch RAM 64b. The number of lines or triads in the data block is specified by the patch length field in the header. In a preferred embodiment, the patch data is encrypted. The following is an example of the format of the data block portion of the microcode patch block for one embodiment.

| triad 0 (ram address 0) |
| triad 1 (ram address 1) |
| triad 2 (ram address 2) |
| . |
| . |
| . |
| triad 63 (ram address 63) |

In the example above, the data block may include up to 64 microcode patch RAM lines or triads. In one embodiment each triad is packed into multiple bytes with a format such as the following:

| op0 | op1 | op2 | opseq |

As shown in the example above, each triad includes three microcode instructions OP0 through OP2 and a sequence control field.

In a preferred embodiment, the microcode patch block is generated by the same micro assembler that is used to assemble the normal microcode routines. The microcode assembler may be set to generate output files in the microcode patch block format.

Figure 4:
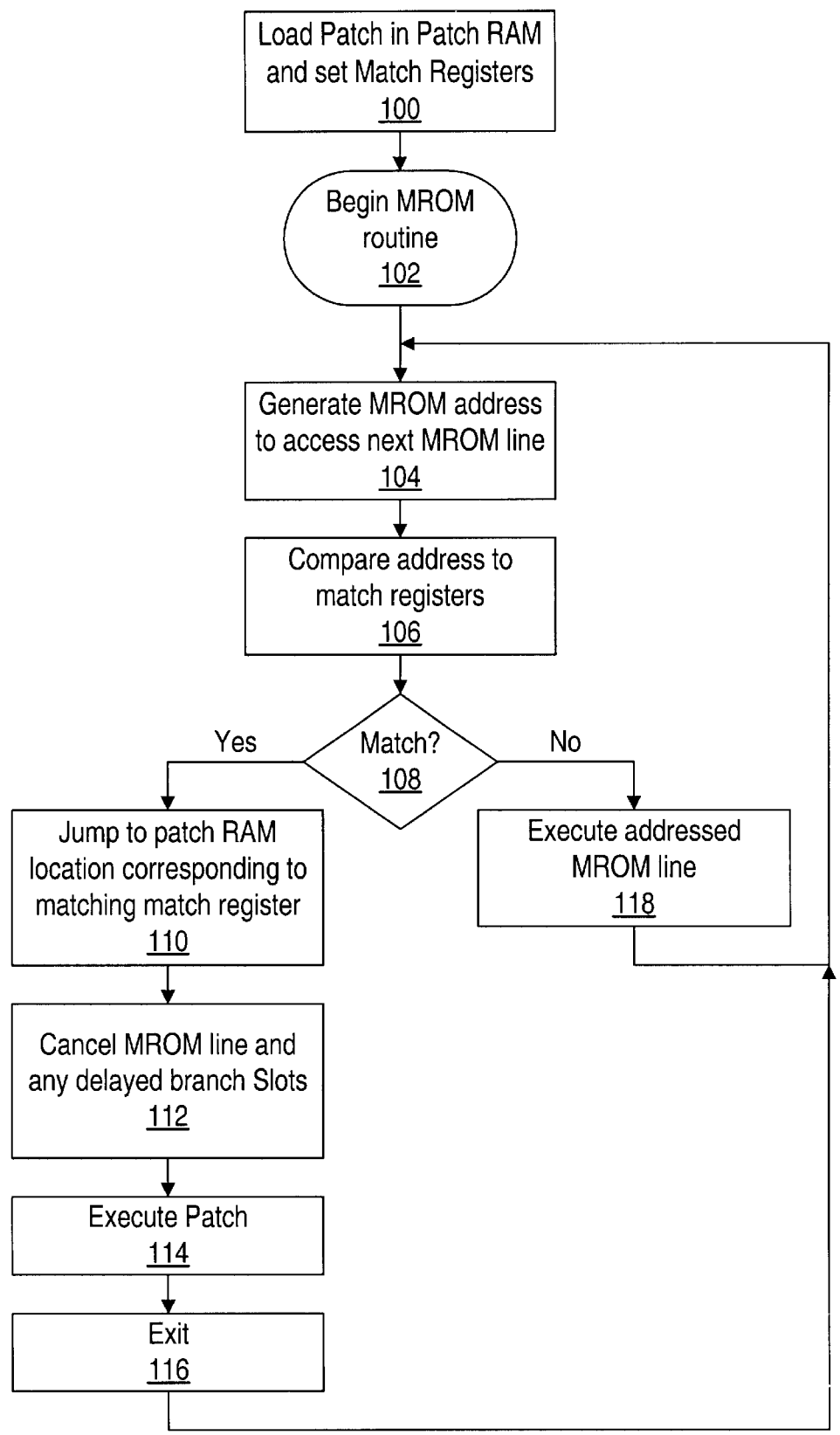
FIG. 4 illustrates one example of a microcode patching mechanism.

Turning now to FIG. 4, a diagram is provided illustrating a method of operation for microcode patching. One or more patches are loaded into a patch RAM, such as patch RAM 64b of FIG. 3, as indicated at 100. In one embodiment, the one or more microcode patches may be stored in the system memory of a computer system. A microcode patch loader stored in microcode ROM 64a (FIG. 3) may be called to load the microcode patch data from the system memory into the microcode patch RAM. Also, as indicated at 100, values are set for match registers. These values may also be read from system memory, such as in the microcode patch header described above. An MROM routine may begin (102). During the execution of MROM routines, MROM addresses are generated in the microcode unit to access microcode instruction lines in the microcode memory (104). As each MROM address is generated, the address is compared to the match registers, as indicated at 106. If no match is detected (at 108), the addressed microcode line is dispatched from the microcode memory (e.g. ROM 64a) to be decoded and executed and normal operation continues, as indicated at 118. However, if a match is detected (at 108), the microcode unit jumps to a patch RAM location corresponding to the matching match register, as indicated at 110. Any MROM line and delayed branch slots that were dispatched from the microcode ROM when the address that triggered the match was generated are cancelled, as indicated at 112. Thus, instead of executing the microcode instruction line indicated by the address that matched one of the match registers, a patch is executed from the patch RAM, as indicated at 114. Upon the completion of the patch, the patch routine jumps back to the microcode ROM, as indicated at 116. Typically the patch will jump back to the next ROM address that would have been accessed from the microcode ROM before the patch was initiated. Note that the diagram of FIG. 4 is merely illustrative of the logical operation of a microcode patching method according to one embodiment. FIG. 4 is not meant to necessarily imply a specific pipeline sequence of operations.

Figure 5:
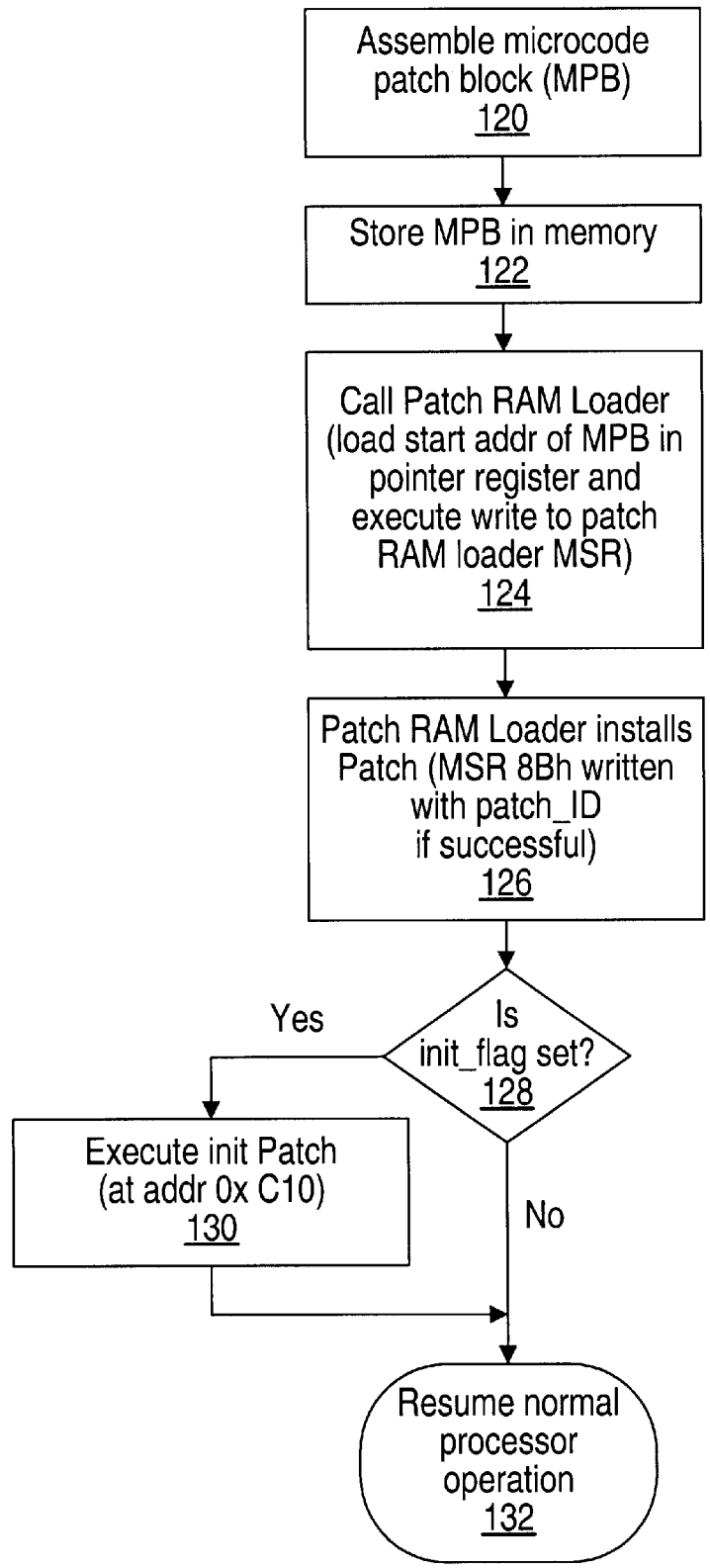
FIG. 5 is flow diagram illustrating one embodiment of microcode patches.

Turning now to FIG. 5, a diagram is provided illustrating a method for loading microcode patches. First, any desired microcode patches are written and assembled (into a microcode patch block (MPB) for example) as indicated at 120. Typically, such patches are written and assembled by a processor manufacturer. However, in some embodiments users may be able to write and assemble their own patches. Typically a microcode patch is written and assembled like other microcode routines. However, the microcode patches may be formatted in a particular format, such as described above in which the patches are located in a microcode patch block having a header and a patch data portion. Typically system software, such as an operating system or BIOS, stores the microcode patch block in system memory, as indicated at 122. In some embodiments, the patch block may be made accessible only in certain processor mode(s) and/or current privilege level(s) (CPL). The microcode patches may then be loaded into the patch RAM. This may be accomplished by calling a microcode patch RAM loader, as indicated at 124. In a preferred embodiment, the patch RAM loader is a microcode routine stored in the microcode ROM. In a preferred embodiment, the patch RAM loader function is called via a write to a model specific register with another register pointing to the microcode patch block in system memory. The MSR used to invoke the patch RAM loader (PRL) may be referred to as MSR PRL, and the register used to point to the location of the patch block in memory may be referred to as the pointer register. Thus, to load a microcode patch block, the linear address of the start of the microcode patch block in system memory is loaded in the pointer register and a write model specific register (WRMSR) instruction to MSR PRL is executed, as also indicated at 124. The patch RAM loader then installs the patch data as indicated at 126. In one embodiment, paging and segmentation are arranged such that the patch RAM loader does not encounter any page faults or segmentation faults while accessing the microcode patch block in system memory. This allows the microcode patch loader routine to be simplified. If the patch data is successfully installed, a processor register may be updated with a patch ID from the microcode patch block header to indicate the successful installation, as also indicated at 126. In a preferred embodiment, this register is MSR 8Bh. The microcode patch RAM loader then checks to see if the init flag from the microcode patch block header is set, as indicated at 128. If the flag is not set, then the patch installation is complete and normal processor operation resumes, as indicate at 132. If the init flag is set, then an init patch is executed, as indicated at 130. For example, if the patch RAM loader determines that the init flag is set, it jumps to a fixed location, e.g. 0xC10, which locates the beginning of the initialization patch. As mentioned above, executing such an initialization patch may be desirable if it is necessary to fix or change something in the processor that is not associated with a ROM microcode routine, and therefore a normal patch using the match registers cannot be triggered. For example, if one of the internal configuration registers of the processor needs to be changed in order to disable a faulty hardware optimization, an initialization patch may be executed to implement that change.

Typically the loading of the patch data into the patch RAM is performed by the system software or BIOS during initialization of the processor, e.g. after power-up or reset. However, in some embodiments, a software application may load a patch into the patch RAM and use the patch to redefine certain lines of microcode instructions in the microcode ROM. For example, an application could use a patch to redefine a microcoded instruction by setting a match register to the address that indicates the beginning of the microcode routine to implement the microcoded instruction that is intended to be redefined. The application can then provide its own microcode as a patch to change the definition of the instruction. However, in typical embodiments, the microcode patch block ID's are not made available to application users and the microcode patch block data is encrypted so that the use of microcode patches may be controlled.

Figure 6:
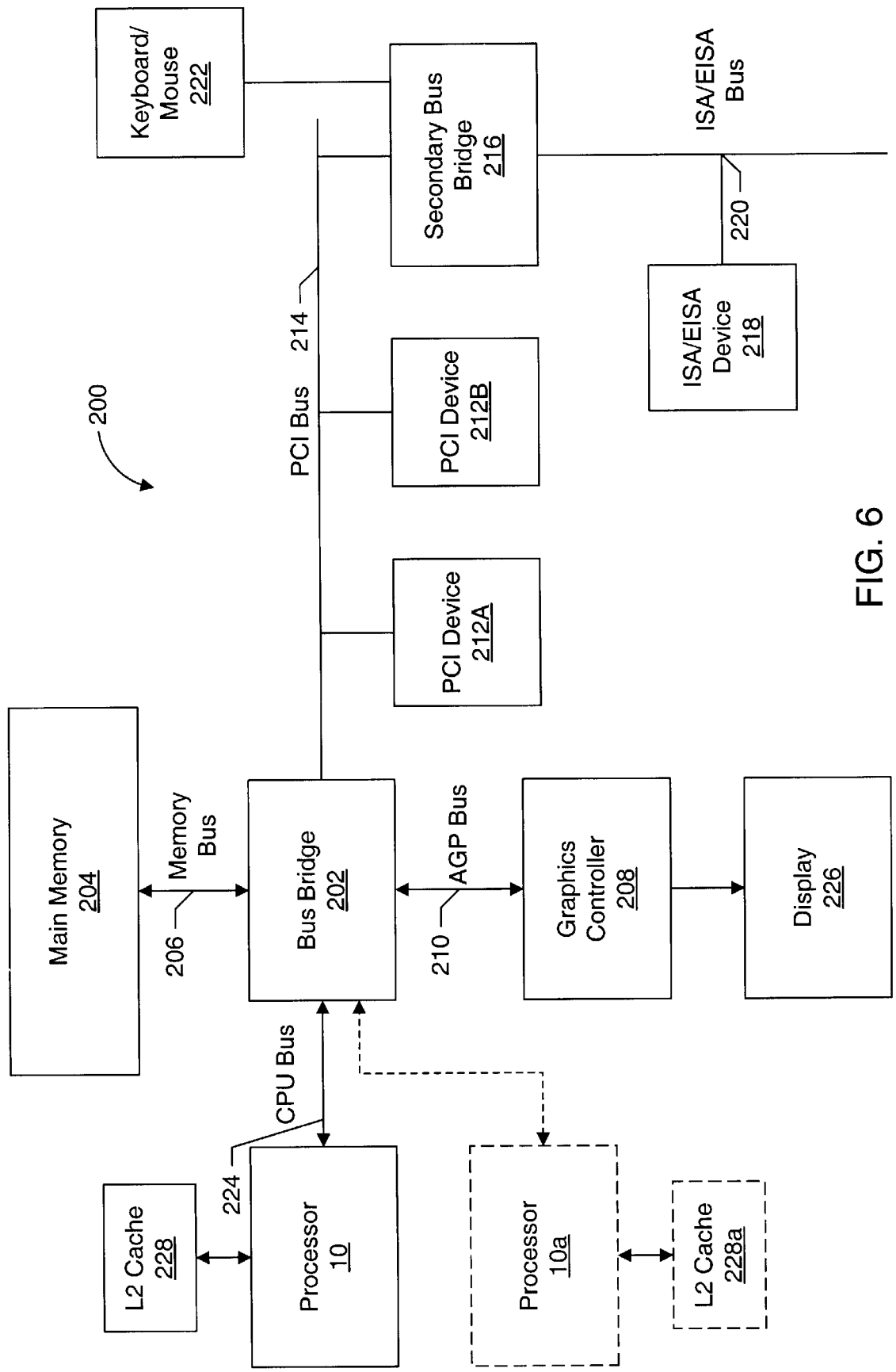
FIG. 6 is a block diagram of one embodiment of a computer system including the processor shown in FIG. 1.

Turning now to FIG. 6, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an Accelerated Graphics Port (AGP) bus 210. Finally, a plurality of PCI devices 212A–212B are coupled to bus bridge 202 through a Peripheral Component Interconnect (PCI) bus 214. A secondary bus bridge 216 may further be provided to accommodate an electrical interface to one or more Extended Industry Standard Architecture (EISA) or Industry Standard Architecture (ISA) devices 218 through an ISA/EISA bus 220. Processor 10 is coupled to bus bridge 202 through a central processing unit (CPU) bus 224 and to an optional level two (L2) cache 228.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA/EISA device 218 is illustrative of various types of peripheral devices, such as a modem, a sound card, and a variety of data acquisition cards such as General Purpose Interface Bus (GPIB) or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 6) or may share CPU bus 224 with processor 10. Furthermore, processor 10a may be coupled to an optional L2 cache 228a similar to L2 cache 228.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

It is noted that various embodiments above may be used separately from other embodiments, or may be used in combination with one or more other embodiments, as desired. Furthermore, an embodiment combining the operation of all the above embodiments is contemplated. Numerous variations and modifications will become apparent to those skilled in the art once the above disclosure is fully appreciated. It is intended that the following claims be interpreted to embrace all such variations and modifications.

What is claimed is:

1. A microcode patching device comprising:
 a first memory configured to store a plurality of microcode instruction lines, wherein an address is provided to said first memory, and wherein said first memory is further configured to provide the microcode instruction line indicated by the address to a decode unit;
 one or more match registers each configured to store a value indicating an address of one of said microcode instruction lines in said first memory;
 a second memory configured to store one or more microcode patch routines; and
 a control unit, wherein if the address provided to said first memory matches the value stored in one of said match registers, said control unit causes one of said one or more microcode patch routines from said second memory to be provided to the decode unit.

2. The device as recited in claim 1, wherein if the address provided to said first memory matches the value stored in one of said match registers, the microcode instruction line provided by said first memory is canceled.

3. The device as recited in claim 1, wherein each one of said one or more match registers indicates a different fixed entry point into said second memory so that whenever the address provided to said first memory matches the value stored in one of said one or more match registers, the control unit causes the microcode patch routine in said second memory located at the fixed entry point as indicated by the one of the match registers having the matching value to be provided to the decode unit.

4. The device as recited in claim 1, wherein if the address provided to said first memory matches the value stored in one of said match registers, said first memory provides both the microcode instruction line indicated by said address and a next microcode instruction line to the decode unit before said second memory provides a first line of the microcode patch routine to be provided to the decode unit, wherein the microcode instruction line indicated by said address and the next microcode instruction line provided from said first memory are canceled.

5. The device as recited in claim 1, wherein said first and second memories are mapped to the same address space.

6. The device as recited in claim 5, wherein said second memory is a contiguously addressed extension of said first memory.

7. The device as recited in claim 1, wherein said first memory is a read only memory.

8. The device as recited in claim 1, wherein said second memory is a random access memory.

9. The device as recited in claim 1, wherein the number of match registers is less than the number of microcode instruction lines that said first memory is configured to store.

10. The device as recited in claim 1, further comprising a third memory configured to store said one or more microcode patch routines, wherein said one or more microcode patch routines are loaded from said third memory into said second memory before the address provided to the first memory matches the value stored in one of the match registers.

11. The device as recited in claim 10, wherein said first and second memories are comprised within a processor and said third memory is system memory of a computer in which the processor resides.

12. The device as recited in claim 10, wherein said first memory stores a microcode patch loader routine for loading the one or more microcode patch routines from said third memory to said second memory.

13. The device as recited in claim 12, wherein said microcode patch loader routine is configured to cause one of the microcode patch routines to be provided from said second memory to the decode unit if a flag is set in said third memory when said microcode patch loader routine loads the microcode patch routines from said third memory to said second memory.

14. The device as recited in claim 13, wherein said microcode patch loader routine causes the microcode patch routine to be provided from said second memory to the decode unit if said flag is set, without an address being provided to said first memory that matches the value stored in one of the match registers.

15. The device as recited in claim 1, wherein each microcode instruction line comprises a plurality of microcode instructions.

16. A method for patching microcode in a processor, comprising:
generating an address to access a microcode memory;
comparing the address to values stored in one or more match registers;
if the address does not match the value in any of the one or more match registers, the processor executing a microcode instruction line from said microcode memory as indicated by the address; and
if the address matches the value in one of the one or more match registers, the processor executing a microcode patch routine stored in a patch memory.

17. The method as recited in claim 16, further comprising:
dispatching the microcode instruction line from said microcode memory as indicated by the address even if the address matches the value in one of the one or more match registers; and
if the address matches the value in one of the one or more match registers, canceling the microcode instruction line dispatched from said microcode memory as indicated by the address.

18. The method as recited in claim 16, further comprising:
dispatching the microcode instruction line indicated by the address and a next microcode instruction line from said microcode memory even if the address matches the value in one of the one or more match registers; and
if the address matches the value in one of the one or more match registers, canceling the microcode instruction line dispatched from said microcode memory as indicated by the address and canceling said next microcode instruction line.

19. The method as recited in claim 16, wherein each one of said one or more match registers indicates a different fixed entry point into said patch memory, wherein said executing a microcode patch routine comprises providing to a decode unit the microcode patch routine in said patch memory located at the fixed entry point indicated by the one of the one or more match registers having the matching value.

20. The method as recited in claim 19, wherein the one or more fixed entry points in the patch memory indicated by the one or more match registers comprise a vector table, wherein at least one of the one or more fixed entry points include a branch to the rest of a microcode patch routine located in another part of the patch memory.

21. The method as described in claim 20, wherein the one or more match registers are a plurality of match registers, and wherein the fixed entry points are located at every other address with a branch delay slot located at the intervening addresses.

22. The method as recited in claim 16, wherein said microcode memory and patch memory are mapped to the same address space.

23. The method as recited in claim 22, wherein said patch memory is a contiguously addressed extension of said microcode memory.

24. The method as recited in claim 16, wherein said microcode memory is a read only memory.

25. The method as recited in claim 16, wherein said patch memory is a random access memory.

26. The method as recited in claim 16, wherein the number of match registers is less than the number of microcode instruction lines that said microcode memory is configured to store.

27. The method as recited in claim 16, further comprising loading one or more microcode patch routines from a system memory into said patch memory.

28. The method as recited in claim 27, wherein said loading comprises calling a patch loader routine in said microcode memory.

29. The method as recited in 28, further comprising upon completion of loading said one or more microcode patch routines, said patch loader routine checking if a flag was set in said system memory, and branching to one of the one or more microcode patch routines located at a fixed location in said patch memory.

30. The method as recited in claim 27, wherein said loading comprises loading at least one microcode patch routine into said patch memory at a fixed address that corresponds to one of said one or more match registers.

31. The method as recited in claim 27, wherein said loading comprises reading a microcode patch header stored in the system memory, wherein said microcode patch header indicates values for said one or more match registers.

32. The method as recited in claim 31, further comprising indicating in said microcode patch header a value for one of said one or more match registers that indicates an address of said microcode memory containing a microcode instruction line to be patched.

33. The method as recited in claim 31, further comprising indicating in said microcode patch header a value for one of said one or more match registers that will not match any address of said microcode memory.

34. A processor comprising:
a microcode memory configured to store a plurality of microcode instruction lines, wherein an address is provided to said microcode memory, and wherein said microcode memory is further configured to provide the microcode instruction line indicated by the address to be executed;
a patch memory configured to store one or more microcode patch routines, wherein each microcode patch routine is located in said patch memory at a fixed entry point, wherein each fixed entry point corresponds to a different address of said microcode memory to be patched; and
a control unit configured to determine if said address provided to said microcode memory is for a microcode instruction line in said microcode memory that is to be patched, wherein if said address provided to said microcode memory is for a microcode instruction line in said microcode memory that is to be patched, said control unit causes the one of said one or more microcode patch routines from said patch memory located at the fixed entry point corresponding to the address provided to said microcode memory to be executed instead of the microcode instruction line in said microcode memory as indicated by the address provided to said microcode memory.

35. The processor as recited in claim 34, wherein said control unit is further configured to cancel both the addressed microcode instruction line from said microcode memory and a branch delay line if the address provided to said microcode memory is for a microcode instruction line in said microcode memory that is to be patched.

36. The processor as recited in claim 34, further comprising one or more match registers, wherein each match register is configured to store a value indicating an address of one of the microcode instruction lines in said microcode memory, wherein said control unit determines if the address provided to the microcode memory is for a microcode instruction line in said microcode memory that is to be patched by comparing the address provided to the microcode memory to the values stored in the match registers.

37. The processor as recited in claim 34, wherein said patch memory is further configured to store an initialization routine at a fixed location, wherein said initialization routine is configured to be executed after said one or more microcode patch routines are loaded in said patch memory if a flag is set.

38. The processor as recited in claim 34, wherein said patch memory is mapped in the same address range as said microcode memory, wherein branch microinstructions branching from said patch memory to said microcode memory may be executed with no more delay than branches within said microcode memory.

* * * * *